US010491674B2

(12) United States Patent
Gawad

(10) Patent No.: US 10,491,674 B2
(45) Date of Patent: Nov. 26, 2019

(54) NETWORK TOPOLOGY TEMPLATES FOR INTERNAL STATES OF MANAGEMENT AND CONTROL PLANES

(71) Applicant: NICIRA, INC., Palo Alto, CA (US)

(72) Inventor: Ahmed Abdel Gawad, Palo Alto, CA (US)

(73) Assignee: Nicira, Inc., Palo Alto, CA (US)

( * ) Notice: Subject to any disclaimer, the term of this patent is extended or adjusted under 35 U.S.C. 154(b) by 248 days.

(21) Appl. No.: 15/799,141

(22) Filed: Oct. 31, 2017

(65) Prior Publication Data

US 2019/0132388 A1 May 2, 2019

(51) Int. Cl.
*H04L 29/08* (2006.01)
*G06F 16/27* (2019.01)
*G06F 16/22* (2019.01)
*H04W 84/02* (2009.01)

(52) U.S. Cl.
CPC ...... *H04L 67/1095* (2013.01); *G06F 16/2219* (2019.01); *G06F 16/2272* (2019.01); *G06F 16/27* (2019.01); *H04W 84/02* (2013.01)

(58) Field of Classification Search
CPC . H04L 67/1095; G06F 16/27; G06F 16/2219; G06F 16/2272; H04W 84/02
See application file for complete search history.

(56) References Cited

PUBLICATIONS

Romain, entitled "New vSphere 6.5 REST API and API Explorer" Nov. 25, 2016 (5 pgs.).

*Primary Examiner* — Michael A Keller
(74) *Attorney, Agent, or Firm* — Hickman Palermo Becker Bingham LLP; Malgorzata A. Kulczycka

(57) ABSTRACT

An approach for creating and cloning templates for a state of a plane is provided. In an embodiment, a method comprises: receiving a template cloning request for cloning a template for a particular plane; parsing the template cloning request to determine a template identifier and one or more configuration pairs included in the template cloning request; based on, at least in part, the template identifier, determining whether a particular template database stores a particular template that is identified by the template identifier; in response to determining that the particular template database stores the particular template that is identified by the template identifier: retrieving the particular template from the particular template database; generating a cloned particular template by cloning the particular template using contents of the one or more configuration pairs; and storing the cloned particular template in a particular state database that is associated with the particular plane.

20 Claims, 6 Drawing Sheets

NETWORK TOPOLOGY TEMPLATES FOR INTERNAL STATES OF MANAGEMENT AND CONTROL PLANES

BACKGROUND

A typical approach for deploying a network topology in a software defined networking (SDN) environment includes creating objects that represent logical switches, logical ports, firewalls, rules, and so forth, and associating the created objects with each other. Once the new network topology is defined, the topology may be realized within a datacenter fabric. Very often, however, creating and realizing the individual objects is time consuming and inefficient.

One way to determine the efficiency of a network deployment process is to measure a corresponding deployment time. A deployment time for deploying a network topology is the end-point of the deployment time, and it is the latest point of the topology realization when the last host realized the last piece of the configuration related to the deployment.

One way to improve a network deployment process is to create a template for a network topology for the purpose of cloning the network topology. For example, one may replicate overlay networks using a template referred to as a blueprint. Another approach includes generating input for deploying multiple identical networks with the same addresses for each node. These approaches, however, shorten the time required for preparing topology cloning requests before the requests are sent to a management plane (MP) and a central control plane (CCP), not the time required by the MP and CCP to actually process the received requests.

SUMMARY

Techniques are described herein for creating templates for a management plane (MP) and a central control plane (CCP), and cloning the created templates to represent states of the MP and the CCP. Using the templates allows shortening the time that the MP and the CCP will spend to process requests for cloning network topologies. The templates are not to be confused with blueprints for overlay networks or inputs for deploying multiple identical networks.

By utilizing the MP templates and the CCP templates, the time that the MP and the CCP will spend to process requests for cloning a new network topology may be significantly shortened. Using the MP/CCP templates improves the performance of the MP and the CCP, and indirectly improves the efficiency of the topology deployment process.

An MP template and a CCP template are created in response to receiving a template creation request. An MP and a CCP template are cloned in response to receiving a template cloning request. An MP template is cloned to an MP cloned template, also referred to as an MP desired state. A CCP template is cloned to a CCP cloned template, also referred to as a processed state. The CCP disseminates its processed state, or states, to local control planes at hosts, and the hosts apply the states to their configurations. Once the states are applied by the hosts, the hosts will "realize" the CCP processed state.

The MP does not track the network cloning process beyond cloning an MP clone template, which is an MP desired state. No updates take place when the cloning of the network is completed by the local control planes of the hosts.

The MP templates may be stored in an MP template database, and the CCP templates may be stored in a CCP template database. The MP/CCP templates are not to be confused with network topology blueprints used to replicate overlay networks, or templates for deploying multiple identical networks with the same addresses for each node. The MP/CCP templates are used to clone the MP/CCP templates and to obtain cloned MP/CCP templates. The cloned MP/CCP templates may be later used to clone a new network topology.

The approach described herein allows reducing the time spent for realizing a network topology within a virtual network when the instances to be used to create new topologies may be predicted in advance and before actually receiving a request to create a new network topology. For example, if it may be predicted that the instances may include objects that would be arranged or defined according to certain patterns, then the MP/CCP templates capturing those patterns may be created in advance.

The approach also allows reducing the time spent for restoring network states after a network failure. This is because restoring the network states using the MP and CCP templates is more efficient than using conventional approaches.

DETAILED DESCRIPTION

In the following description, for the purposes of explanation, numerous specific details are set forth in order to provide a thorough understanding of the presently described method. It will be apparent, however, that the present approach may be practiced without these specific details. In other instances, well-known structures and devices are shown in block diagram form to avoid unnecessarily obscuring the present approach.

Example System for Creating and Cloning MP/CCP Templates

In an embodiment, a method and a system are provided for improving performance of an MP and a CCP in the SDN environment. The process includes creating MP/CCP templates in advance, and storing the created templates in MP/CCP template databases. Upon receiving a request for creating an MP template, information included in the creating request is used to create the MP template. The created MP template is stored in an MP template database. Upon receiving a request for cloning an MP template, the MP template is retrieved from the MP template database and cloned using contents of the cloning request. The cloned template captures an internal desired state of the MP, and it is stored in an MP state database.

Upon receiving a request for creating a CCP template, information included in the creating request is used to create the CCP template. The created CCP template is stored in an CCP template database. Upon receiving a request for cloning an CCP template, the CCP template is retrieved from the CCP template database and cloned using contents of the cloning request. The cloned template captures an internal processed state of the CCP, and it is stored in a CCP state database.

The process for creating MP/CCP templates in advance and cloning the created MP/CCP templates in response to receiving cloning requests allows reducing the time that the MP and the CCP will spend to deploy a new network topology.

Figure 1:
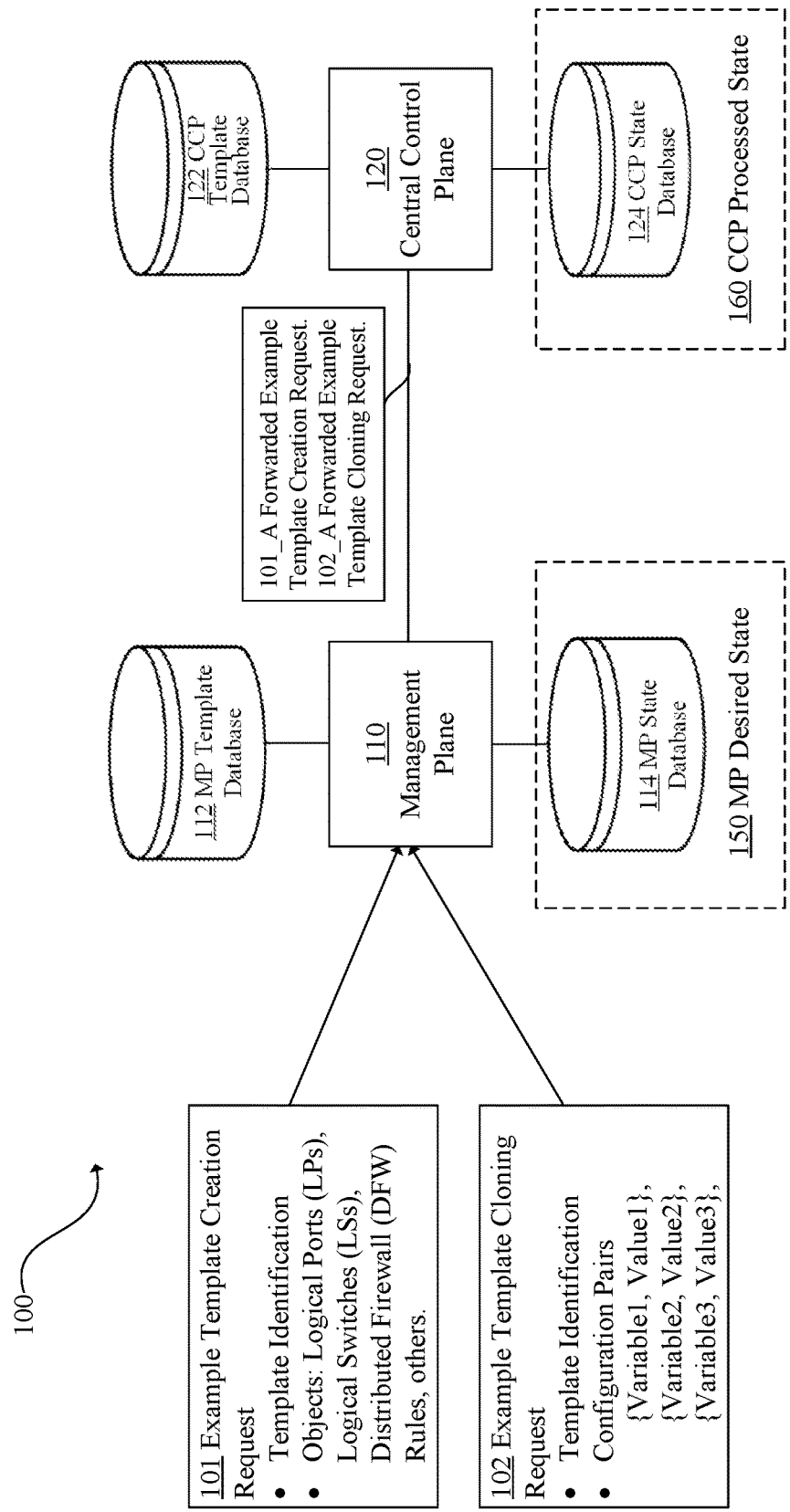
FIG. 1 is a block diagram depicting an example system architecture for generating and using templates for internal states of management and central control planes.

FIG. 1 is a block diagram depicting an example system architecture 100 for generating and using templates for internal states of management and central control planes. In the depicted example, system 100 includes an MP 110 and a CCP 120. MP 110 may maintain an MP template database 112 and an MP state database 114. CCP 120 may maintain a CCP template database 122 and a CCP state database 124.

FIG. 1 also depicts an example template creation request 101 and an example template cloning request 102. Example template creation request 101 comprises a template identification and object definitions for defining logical ports, logical switches, rules, and the like. Example template cloning request 102 comprises a template identification and one or more configuration pairs. The examples are described in detail in the following chapters.

A. Management Plane

MP 110 is configured to provide a single API entry point to the virtual environment of system 100. MP 110 may be configured to handle user configurations, user queries, and operational tasks on management nodes in the system. MP 110 may also be configured to collect and process status and statistical information received from CCP 120 and other local planes.

MP 110 may maintain and have access to various databases, including MP template database 112 and MP state database 114. MP template database 112 may be used to store one or more MP templates that were created before requests for cloning the MP templates can be received. MP state database 114 may be used to store a cloned MP template that captures a desired state of the MP.

MP 110 may receive one or more template creation requests 101 and one or more example template cloning requests 102, and forward the received requests as forwarded requests 101_A and 102_A, respectively, to CCP 120.

Upon receiving template creating request 101, MP 110 may determine that request 101 is for creating a new MP template. If the request is for creating the new MP template, then MP 110 creates a new MP template as instructed, and stores the new MP template in MP template database 112.

Upon receiving template cloning request 102, MP 110 may determine that the request is for cloning an already created MP template. If the request is for cloning an already created, particular template, then MP 110 retrieves the particular MP template from MP template database 112, clones the retrieved template, and stores the cloned MP template in MP state database 114. MP state database 114 represents an MP desired state 150.

B. Central Control Plane

Depending on the implementation, CCP 120 may comprise a plurality of controller nodes (e.g., physical computers, virtual machines, containerized applications) that operate as a cluster, as described for example, in U.S. Pat. No. 9,363,210, which is incorporated by reference herein. In general, the term control planes may encompass both a CCP and local control plane (LCP) elements distributed on each physical host in the network as described in U.S. Pat. No. 9,178,833, which is also incorporated by reference herein. This disclosure, however, is directed to a CCP.

In an embodiment, CCP 120 maintains and have access to various databases, including CCP template database 122 and CCP state database 124. CCP template database 122 may store one or more CCP templates that were created before requests for cloning the CCP templates can be received.

CCP 120 may receive one or more template creating requests 101_A forwarded to CCP 120 by MP 110. Upon receiving request 101_A, CCP 120 may determine that the request is for creating a new CCP template. Therefore, CCP 120 may create the new CCP template as instructed.

CCP 120 may also receive one or more template cloning requests 102_A, forwarded to CCP 120 by MP 110. Upon receiving request 102_A, CCP 120 may determine that the request is for cloning a particular CCP template. Therefore, CCP 120 may retrieve the particular CCP template from CCP template database 122, clone the particular CCP template, and store the cloned CCP template in CCP state database 124. CCP state database 124 represents a CCP processed state 160.

C. Example Template Cloning Request for Cloning an MP Template

In an embodiment, example template cloning request 102 is provided to MP 110 to clone an MP template. Template cloning request 102 may be generated in a variety of ways, some of which are described in FIG. 2.

Template cloning request 102 may include a template identification and one or more configuration pairs. A template identification may be an identifier or a name of a template. Configuration pairs included in template cloning request 102 may include one or more associations between variables and values of the corresponding variables.

Variables in the configuration pairs may correspond to the variables that are included in a template identified by the template identifier in template cloning request 102. Values for the corresponding variables in the configuration pairs may correspond to actual values, such as alphanumerical strings, integers and/or floats, that can be substituted in the template for the names of the corresponding variables. For example, if a template includes an expression:

$$\text{Attachment: variable1} \qquad (1)$$

and a configuration pair includes the pair:

$$\{variable1, \mathit{VM}1.port0\} \qquad (2)$$

then, upon substituting the variable1 in expression (1) with the value from expression (2), the following may be obtained:

$$\text{Attachment: } \mathit{VM}1.port0 \qquad (3)$$

Once the process of substituting the names of the variables in a MP template with the values of the corresponding variables is completed, the resulting cloned MP template is stored in MP state database 114. The cloned MP template captures a desired state of MP 110.

D. Example Template Cloning Request for Cloning a CCP Template

In an embodiment, template cloning request 102 is provided to MP 110, and then forwarded by MP 110 as template cloning request 102_A to CCP 120. The content of template cloning request 102_A may be parsed by CCP 120 and used to generate a clone CCP template. Generating of the clone CCP template may be performed using the substation process described above.

Once the process of substituting the names of the variables in a CCP template with the values of the corresponding variables is completed, the resulting cloned CCP template is stored in CCP state database 124. The cloned CCP template captures a processed state of CCP 120.

Example Template Cloning Requests

Figure 2:
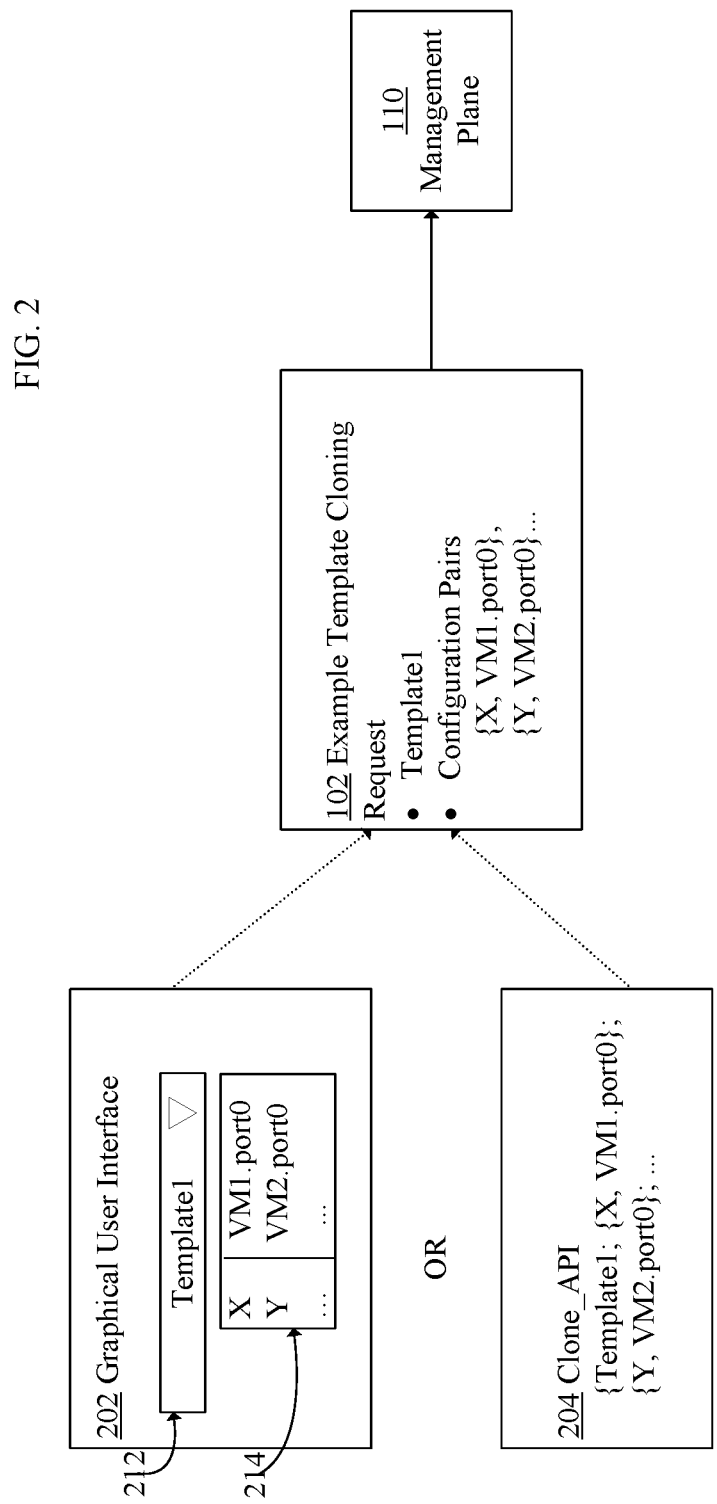
FIG. 2 depicts example approaches for providing an example template cloning request.

FIG. 2 depicts example approaches for providing an example template cloning request. The examples depicted in FIG. 2, include two different ways of generating a template cloning request. The examples, however, should not be viewed as limiting in any way.

One way of providing an example template cloning request for cloning an example MP template includes using a graphical user interface (GUI) 202. GUI 202 may be configured to allow selecting a template identifier from a set of identifiers each created for a corresponding template. In the example depicted in FIG. 2, a template identifier may be selected using a selection feature 212 of graphical user interface 202. Feature 212 may be implemented as a pull-down menu that displays a list of identifiers for the already created templates, and that allows a user to select a particular identifier from the displayed list.

GUI 202 may also include an interactive feature 214 allowing entering one or more configuration pairs. A configuration pair may include a name of a variable and a value that may be associated with the variable. One of many ways of implementing feature 214 is implementing the feature as a table having one column for entering the names of the variables and another column for entering the values for the variables.

Another way of providing an example template cloning request for cloning an example MP template includes issuing an application programming interface (API) call, such as a clone_API call 204. The clone_API call may be directed to an API interface (not shown), such as a representational state transfer (REST) API interface, provided by MP 110. Clone_API 204 may include a plurality of parameters. One of the parameters may include a name of the template; other parameters may include one or more configuration pairs, each of which may include a name of a variable and a value that is associated with the variable.

As depicted in FIG. 2, an example, example template cloning request 102 is provided to MP 110. MP 110 uses template cloning request 102 to generate an internal state of MP 110. Specifically, upon receiving template cloning request 102 via GUI 202 or as clone_API 204 call, MP 110 parses the content of template cloning request 102, and extracts a name of a template and configuration pairs from template cloning request 102. Merely to illustrate a simple example, template cloning request 102 includes a name Template1 and configuration pairs {X, VM1.port0}, {Y, VM2.port0}. The parsed information is then used to generate the internal state of MP 110.

Implementation Considerations for Defining a Network Topology

One way to measure the efficiency of a network deployment process is to measure a deployment time. The deployment time may be long, especially if the network topology includes hundreds of instances of network elements. For example, the deployment time may be long even if the topology size is small but there are numerous instances of the network being deployed, or if the number of instances is small but the network topology is large.

There are many different ways of computing a deployment time. A deployment time for defining entities in MP 110 may include for example, a sum of the following: a time delay for queuing an API call input, a parsing time for parsing an API call, a validation time for validating of objects referenced in the API call against existing data in a management plane distributed database, a processing time for processing the API call, a storing time for storing an internal state data of the management plane in the management plane distributed database, a preparing time for preparing data to be forwarded to a control plane, and a transmission time for forwarding the data from the management plane to the control plane.

A deployment time for realizing entities of a new network topology in CCP 120 may include for example, a sum of the following: a time delay for queuing a forwarded request at the control plane, a parsing time for parsing the forwarded request, a validation time for validating of objects referenced in forwarded request against existing data in the control plane distributed database, a processing time for processing the forwarded request, a storing time for storing an internal state data of the control plane in the control plane distributed database, a preparing time for preparing data to be forwarded to a local control plane, and a transmission time for forwarding the data from the control plane to the local control plane.

The approach presented herein allows reducing the time that an MP and a CCP will spend to process requests for cloning a new network topology. The time is reduced because the MP and the CCP use the corresponding MP and CCP templates, and each of MP and CCP executed one REST API call per entity.

When deploying a network topology using one REST API call per entity, the deployment times at the management plane and the deployment times at the control plane may include the delays attributed to each and every REST API call. In sharp contrast, deploying a new network topology through a reuse of a preprocessed network topology template, as in the presented approach, can reduce, or even eliminate, most of the deployment time delays.

A deployment time computed for implementations that use the presented approach includes the delay attributed to calling one REST API with the required data to customize a network topology clone. The required data may include, but is not limited to, a template identifier, or a template name for a template to be looked up in a template database, and a list of configuration pairs that specify virtual machine ports to be instantiated, host identifiers on which the virtual machines are to be instantiated, logical ports to which the virtual machines are to be connected, and so forth.

Cloning a Management Plane Template

Figure 3:
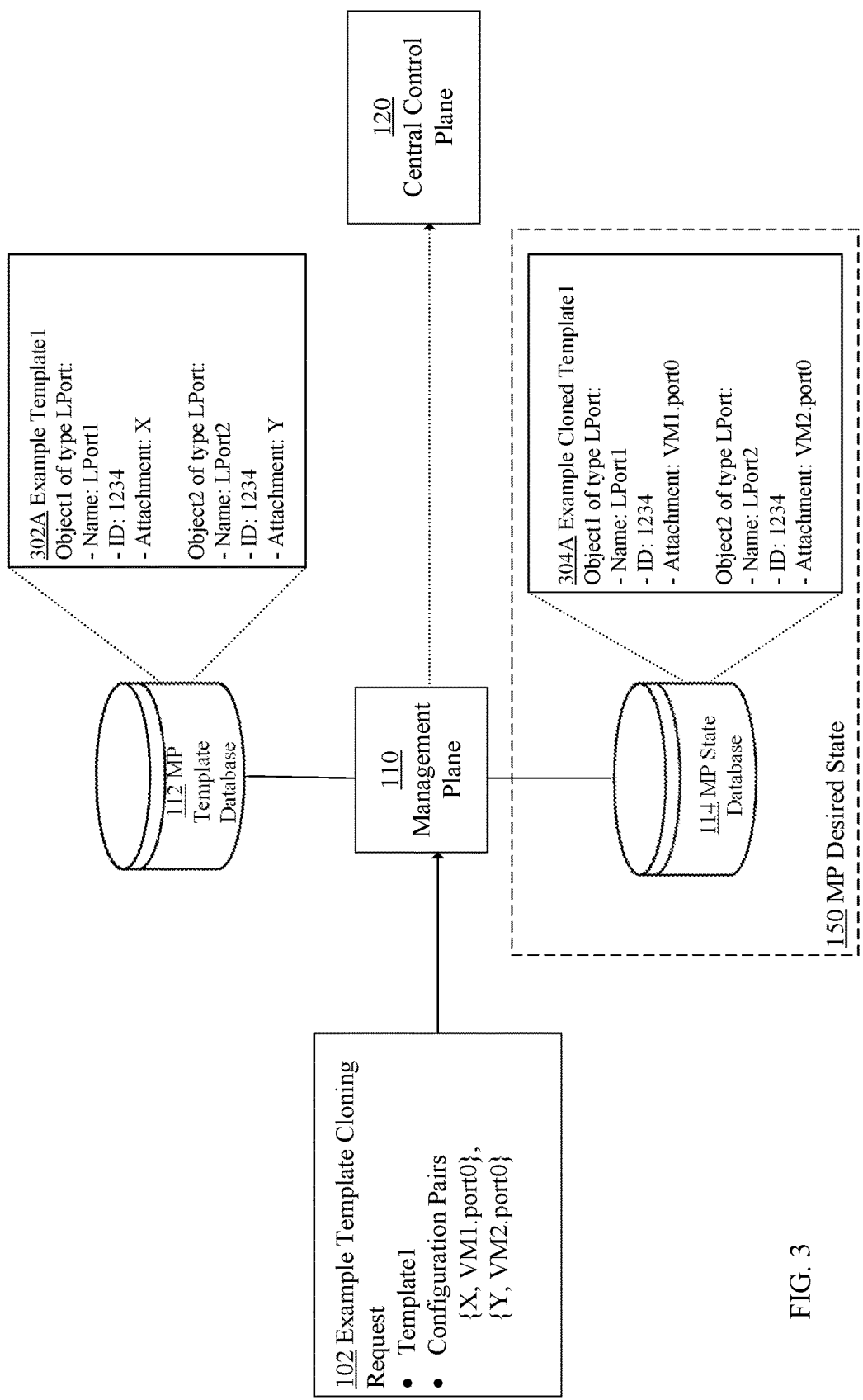
FIG. 3 depicts an example process for cloning an example management plane template.

FIG. 3 depicts an example process for cloning an example MP template. In the depicted example, it is assumed that an example MP template has been already created and stored in MP template database 112. An example MP template may include definitions of one or more objects. The convention used to define the object depends on the implementation. The provided example should not be viewed as limited in any way.

The example depicted in FIG. 3 includes an example Template1 302A. Template1 302A includes two objects, and the type of both objects is LPort. The first object has a name LPort1, an identifier 1234, and an attachment identified by a variable X. The second object has a name LPort2, an identifier 1234, and an attachment identified by a variable Y. The examples, however, should not be viewed as limiting in any way.

An example template cloning request 102 provided to MP 110 includes an identification of the template to be cloned, and configuration pairs that include associations between variables and values for the corresponding variables. In the example depicted in FIG. 3, example template cloning request 102 includes an identification of Template1, and configuration pairs {X, VM1.port0} and {Y, VM2.port0}. This example, however, should not be viewed as limiting in any way.

Upon receiving example template cloning request 102, MP 110 may parse template cloning request 102 to identify individual components of template cloning request 102. The parsed information indicates that the template to be cloned is the template identified by Template1, and both variables X and Y in Template1 are to be assigned the values of VM1.port0 and VM2.port0, respectively.

Once template cloning request 102 is parsed and the components of template cloning request 102 are identified, MP 110 retrieves the requested template, and uses the information included in the pairs to clone the template. In the example depicted in FIG. 3, MP 110 may retrieve example Template1 302A from MP template database 112, and use the information included in the pairs to assign values to X and Y. The resulting cloned template is depicted as an example cloned Template1 304A.

Example cloned Template1 304A may be stored in MP state database 114 as part of an MP desired state 150. A desired state, also referred to as a desired logical state, is a state of a management plane.

Cloning a Control Plane Template

Figure 4:
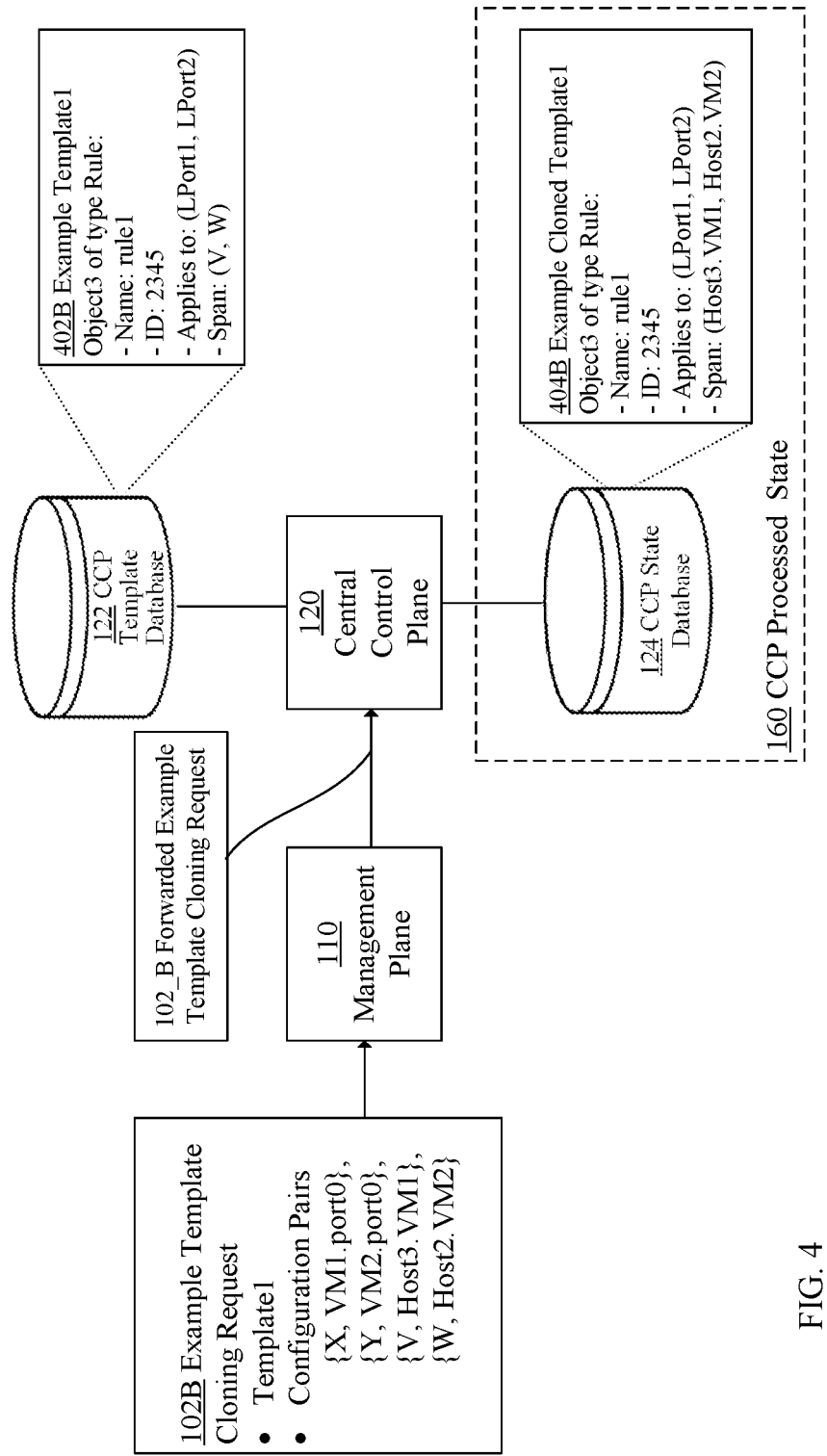
FIG. 4 depicts an example process for cloning an example control plane template.

FIG. 4 depicts an example process for cloning an example CCP template. For the purpose of explaining the depicted example, it is assumed that an example CCP template has been already created and stored in CCP template database 122. An example CCP template may include definitions of one or more objects. The convention used to define the objects depends on the implementation. The provided example should not be viewed as limited in any way.

The example depicted in FIG. 4 includes an example Template2 402B. Template2 402B includes an Object3. The Object3 has the type Rule. The Object3 has a name rule1, and an identifier 2345. The Object3 also includes an indication that the rule1 applies to LPort1 and LPort2, and pertains to spanning a V onto W.

An example template cloning request 102B provided to MP 110 may be forwarded by MP 110 to CCP 120 as a forwarded template cloning request 102_B. Forwarded template cloning request 102_B may include a template identification and one or more configuration pairs. The template identification may be an identifier of the template to be cloned. The configuration pairs may include associations between variables and values for the corresponding variables. In the example depicted in FIG. 4, example template cloning request 102_B includes an identification of Template2, and configuration pairs {X, VM1.port0}, {Y, VM2.port0}, {V, Host3.VM1}, and {W, Host2.VM2}. This example, however, should not be viewed as limiting in any way.

Upon receiving forwarded example template cloning request 102_B, CCP 120 may parse template cloning request 102_B to identify individual components of template cloning request 102_B. By parsing template cloning request 102_B, CCP 120 may determine that the input includes the identification of Template2, and four configuration pairs {X, VM1.port0}, {Y, VM2.port0}, {V, Host3.VM1}, and {W, Host2.VM2}. That information indicates that the template to be cloned is the template identified by Template2, that the value Host3.VM1 is to be assigned to the variable V, and the value Host2.VM2 is to be assigned to the variable W.

Once template cloning request 102_B is parsed, and the components of template cloning request 102_B are identified, CCP 120 retrieves the requested template, and uses the information included in the configuration pairs to clone the template. In the example depicted in FIG. 4, CCP 120 may retrieve example Template2 402B from CCP template database 122, and use the information included in the configuration pairs to assign the value Host3.VM1 to the variable V, and the value Host2.VM2 to the variable W.

Example cloned Template1 404B may be stored in CCP state database 124 as part of a CCP processed state 160.

Example Workflow for Creating a Management Plane Template

Figure 5B:
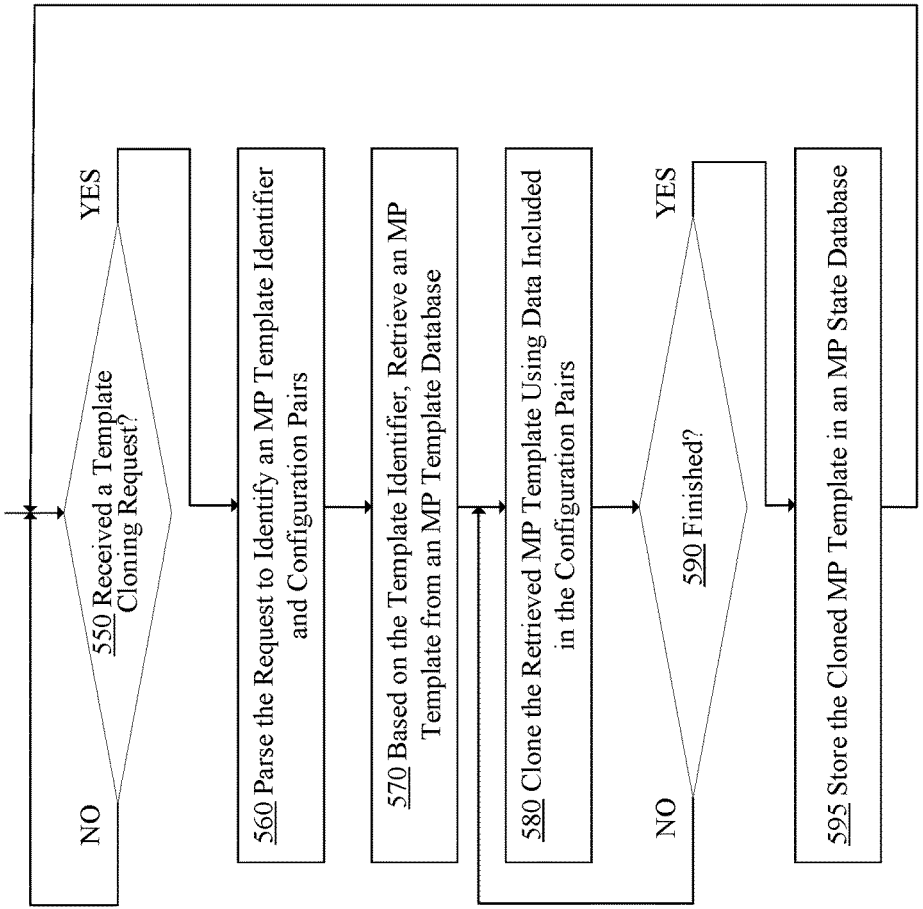
FIG. 5B depicts an example workflow process for cloning an example management plane template.
Figure 5A:
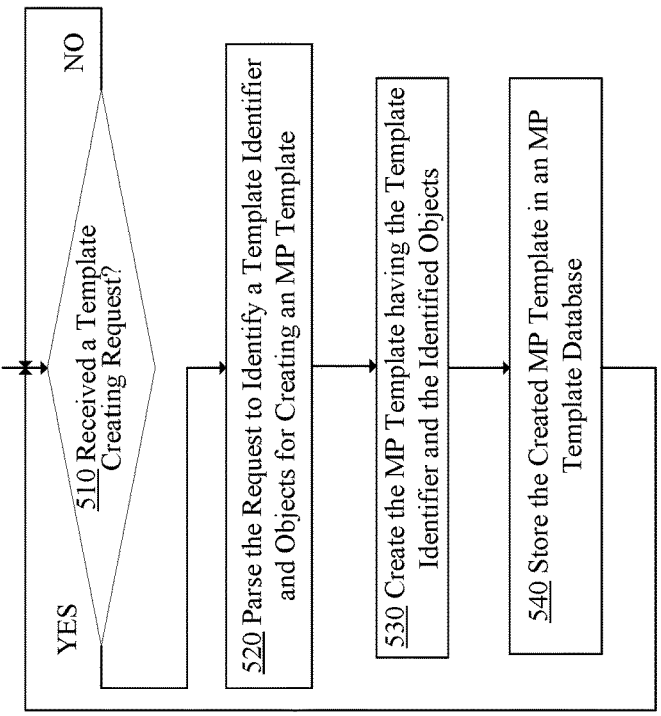
FIG. 5A depicts an example workflow process for creating an example management plane template.

FIG. 5A depicts an example workflow process for creating an example MP template. In step 510, a test is performed to determine whether an MP template creation request is received. If the request is received, then step 520 is performed; otherwise, the testing continues in step 510.

In step 520, the received request for creating a template is parsed. The parsing may be performed by MP 110 or by an agent cooperating with MP 110. The parsing may include identifying a template identifier of the template to be created. The template identifier may be an alphanumerical string corresponding to a name of the template, or a numerical string corresponding to a numerical identifier of the template. The parsing may also include identifying one or more object definitions that are to be included in the template.

In an embodiment, the received request may be for modifying a template that has been already created and stored in MP database 112. There might be a variety of reasons for modifying an existing MP template. For example, an existing MP template may become outdated or obsolete, and therefore the existing MP template may be either deleted or modified. If the existing MP template can be modified, then the received request will include a name identifier of the existing MP template, and definitions of one or more objects that are to be redefined, or added, in the existing MP template.

If the request is for deleting a particular MP template, then the particular MP template is deleted from MP template database 112.

In step 530, the parsed information is used to create, or modify, a template. For example, the template identifier may be used as the name of the newly created MP template or to retrieve the already existing MP template. Furthermore, the object definitions included in the parsed information may be used to create the objects in the new MP template, or to redefine the objects already included in the existing MP template.

In step 540, the created, or modified, template is stored in MP template database 112. Depending on the organization of MP template database 112, storing the MP template in MP template database 112 may include modifying an index maintained by MP template database 112, allocating space for storing the new MP template, and storing a hyperlink to the space in MP template database 112 in which the new MP template is stored.

Once a new MP template, or a modified MP template, is stored in MP template database 112, the MP template is available to MP 110 for cloning.

Example Workflow for Cloning a Management Plane Template

FIG. 5B depicts an example workflow process for cloning an example MP template. In step 550, a test is performed to determine whether an MP template cloning request is received. If the request is received, then step 560 is performed; otherwise, the testing continues in step 550.

The request may include a template identifier and one or more configuration pairs for assigning values to variables in the template. An example template cloning request may be provided in a variety of ways. For example, the request may be provided via a graphical user interface similar to GUI 202 depicted in FIG. 2. The request may also be provided as an API call similar to Clone_API call 204 depicted in FIG. 2.

In step 560, the received request is parsed to identify a template identifier and one or more configuration pairs. The template identifier may be an alphanumerical string representing a name of the template, or a numerical string representing a numerical identifier of the template. The configuration pairs may include associations between the variables in the template and the values that are to be assigned to the corresponding variables. Examples of different configuration pairs are described in example template cloning request 102 in FIG. 3 and example template cloning request 102B in FIG. 4.

In step 570, based on the template identifier, a corresponding MP template is retrieved from MP template database 112.

In step 580, the MP template retrieved from MP template database 112 is cloned. The cloning includes, among other things, identifying one or more variables that are included in the MP template, and determining whether the provided configuration pairs include values for the variables included in the MP template. If so, then the names of the variables in the MP template are replaced with the values retrieved from the corresponding configuration pairs. Substituting of the names of the variables in the MP template with the corresponding values from the configuration pairs is performed for all variables included in the MP template.

In step 590, a test is performed to determine whether the substitutions of the names of the variables in the MP template have been completed for all variables. If they have, then cloning of the MP template is completed and step 595 is performed. Otherwise, step 580 is repeated to continue the substitutions.

In step 595, the cloned MP template is stored in MP state database 114. Once stored in MP state database 114, the cloned MP template captures a desired state of MP 110.

The process described in FIG. 5B may be performed each time an MP template cloning request is received.

Example Workflow for Creating a Control Plane Template

Figure 6B:
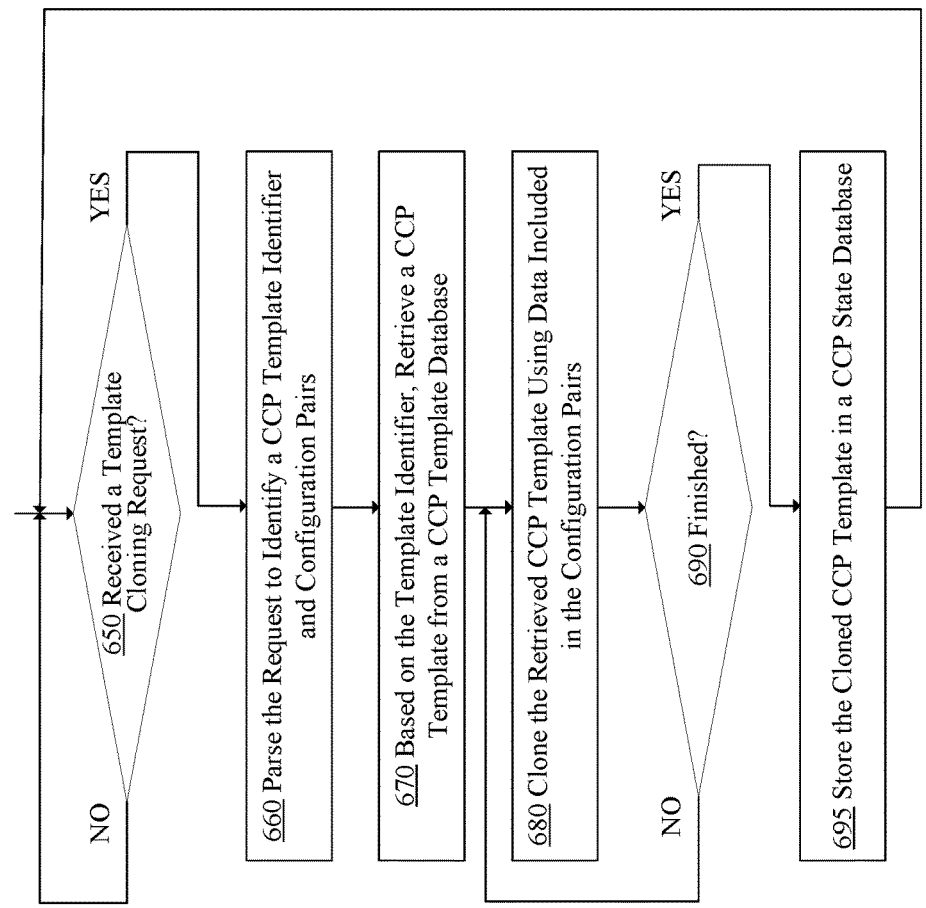
FIG. 6B depicts an example workflow process for cloning an example control plane template.
Figure 6A:
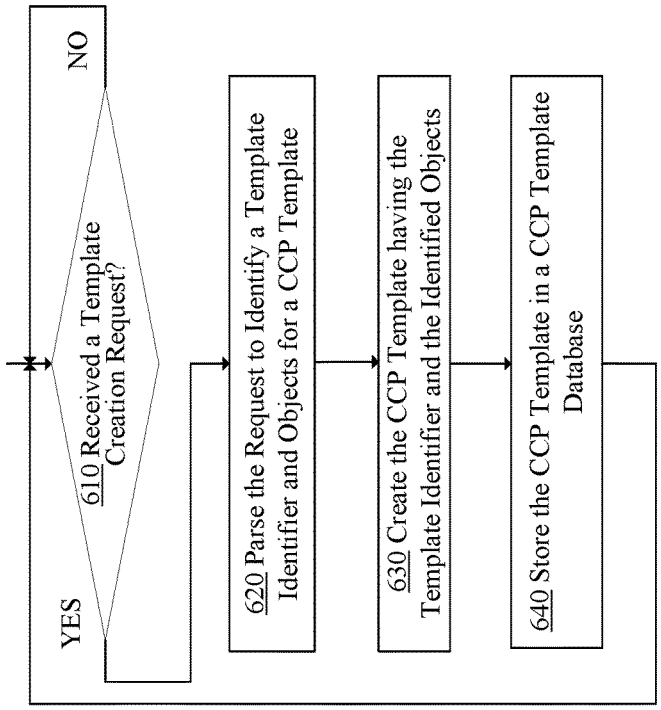
FIG. 6A depicts an example workflow process for creating an example control plane template.

FIG. 6A depicts an example workflow process for creating an example CCP template. In step 610, a test is performed to determine whether a CCP template creation request is received. The request may be received from MP 110 or from an SDN manager. If the request is received, then step 620 is performed; otherwise, the testing continues in step 610.

In step 620, the received request for creating a CCP template is parsed. The parsing may be performed by CCP 120 or by an agent cooperating with CCP 120. The parsing may include identifying a template identifier of the template to be created. The template identifier may be an alphanumerical string corresponding to a name of the template, or a numerical string corresponding to a numerical identifier of the template. The parsing may also include identifying one or more object definitions that are to be included in the template.

In an embodiment, the received request may be for modifying a template that has been already created and stored in CCP database 122. The need for modifying an existing CCP template may arise when the existing CCP template becomes outdated or obsolete, and therefore the existing CCP template may be either deleted or modified. If the existing CCP template can be modified, then the received request will include a name identifier of the existing CCP template, and definitions of one or more objects that are to be redefined, or added, in the existing CCP template.

If the request is for deleting a particular CCP template, then the particular CCP template is deleted from CCP template database 122.

In step 630, the parsed information is used to create, or modify, a template. For example, the template identifier may be used as the name of the newly created CCP template or to retrieve the already existing CCP template. Furthermore, the object definitions included in the parsed information may be used to create the objects in the new CCP template, or to redefine the objects already included in the existing CCP template.

In step 640, the created, or modified, template is stored in CCP template database 122. Depending on the organization of CCP template database 122, storing the CCP template in CCP template database 122 may include modifying an index maintained by CCP template database 122, allocating space for storing the new CCP template, and storing a hyperlink to the space in CCP template database 122 in which the new CCP template is stored.

Once a new CCP template, or a modified CCP template, is stored in CCP template database 122, the CCP template is available for cloning.

Example Workflow for Cloning a Control Plane Template

FIG. 6B depicts an example workflow process for cloning an example CCP template. In step 650, a test is performed to determine whether a CCP template cloning request is received. The request may be provided by MP 110 as for example, forwarded example template cloning request 102_B described in FIG. 4. The request may include a template identifier and one or more configuration pairs for assigning values to variables in the template.

If request is provided, then step 660 is performed. Otherwise, the testing continues in step 650.

In step 660, the received request is parsed to identify a template identifier and one or more configuration pairs. The template identifier may be an alphanumerical string representing a name of the template, or a numerical string representing a numerical identifier of the template. The configuration pairs may include associations between the variables in the template identified using the template identifier and the values that are to be assigned to the corresponding variables. Examples of different configuration pairs are described in example template cloning request 102 in FIG. 3 and example, template cloning request 102B in FIG. 4.

In step 670, based on the template identifier, a corresponding CCP template is retrieved from CCP template database 122.

In step 680, the CCP template retrieved from CCP template database 122 is cloned. The cloning includes, among other things, identifying one or more variables that are included in the CCP template, and determining whether the provided configuration pairs include values for the variables included in the CCP template. If they do, then the names of the variables in the CCP template are replaced with the values retrieved from the corresponding configuration pairs. Substituting the names of the variables in the CCP template with the corresponding values from the configuration pairs is performed for all variables included in the CCP template.

In step 690, a test is performed to determine whether the substitutions of the names of the variables in the CCP template have been completed for all variables. If they have, then cloning of the CCP template is completed and step 695 is performed. Otherwise, step 680 is repeated to continue the substitutions.

In step 695, the cloned CCP template is stored in CCP state database 124. Once stored in CCP state database 124, the cloned CCP template captures a processed state of CCP 120.

The process described in FIG. 6B may be performed each time a CCP template cloning request is received.

Extensions and Alternatives

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus, and used for storing information and software instructions to be executed by a processor. Main memory may also be used for storing temporary variables or other intermediate information during execution of software instructions to be executed by one or more processors.

Software instructions, when stored in storage media accessible to a processor, render the hardware machine into a special-purpose computing machine that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a machine to perform specific operations, and including, but not limited to, application software, desktop applications, scripts, binaries, operating systems, device drivers, boot loaders, shells, utilities, system software, JAVASCRIPT, web pages, web applications, mobile applications, plugins, embedded software, microcode, compilers, debuggers, interpreters, virtual machines, linkers, and text editors.

The hardware machine also includes a read-only memory (ROM) or other static storage device coupled to a communications bus for storing static information and software instructions for one or more hardware processors.

General Considerations

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise," and variations of those terms, such as "including," "includes," "comprising," "comprises," "comprised" and the like, are intended to be inclusive, and not to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method for creating and cloning templates for a state of a plane, the method comprising:
    receiving a template cloning request for cloning a template for a particular plane;
    wherein the particular plane is a management plane (MP) or a central control plane (CCP) in a software defined networking (SDN) environment;
    parsing the template cloning request to determine a template identifier and one or more configuration pairs included in the template cloning request;
    based on, at least in part, the template identifier, determining whether a particular template database stores a particular template that is identified by the template identifier;
    in response to determining that the particular template database stores the particular template that is identified by the template identifier:
        retrieving the particular template from the particular template database;
            generating a cloned particular template by cloning the particular template using contents of the one or more configuration pairs; and
            storing the cloned particular template in a particular state database that is associated with the particular plane.

2. The method of claim 1, wherein the particular plane is the MP in the SDN environment;
    wherein the particular template database is an MP template database;
    wherein the particular template is an MP template stored in the MP template database;
    wherein the particular state database is an MP state database; and
    wherein the cloned particular template is a cloned MP template.

3. The method of claim 1, wherein the particular plane is the CCP in the SDN environment;
    wherein the particular template database is a CCP template database;
    wherein the particular template is a CCP template stored in the CCP template database;
    wherein the particular state database is a CCP state database; and
    wherein the cloned particular template is a cloned CCP template.

4. The method of claim 1, further comprising: receiving a first request to create a first template in the particular template database;
    parsing the first request to determine a first template identifier and one or more first configuration pairs included in the first request;
    based on, at least in part, the first template identifier, determining whether the particular template database stores the first template that is identified by the first template identifier;
    in response to determining that the particular template database stores the first template that is identified using the first template identifier, generating a modified first template by modifying the first template using contents of the one or more first configuration pairs, and storing the modified first template in the particular template database; and
    in response to determining that the particular template database does not include the first template, creating the first template using contents of the one or more first configuration pairs and storing the first template in the particular template database.

5. The method of claim 1, further comprising: in response to determining that the template identifier does not identify any particular template in the particular template database, requesting instructions for creating a second template and for storing the second template in the particular template database.

6. The method of claim 1, wherein the particular template includes one or more objects; and wherein an object, from the one or more objects, has an associated type, an associated name, an associated identifier, and one or more associated functions.

7. The method of claim 1, further comprising: receiving a second request to delete a second template from the particular template database;
    parsing the second request to determine a second template identifier included in the second request;
    based on, at least in part, the second template identifier, determining whether the particular template database stores the second template that is identified by the second template identifier;
    in response to determining that the particular template database stores the second template that is identified by the second template identifier, deleting the second template from the particular template database; and
    in response to determining that the particular template database does not include the second template, generating an error message and transmitting the error message to an entity that sent the second request.

8. One or more non-transitory computer-readable storage media storing one or more computer instructions which, when executed by one or more processors, cause the one or more processors to perform:
    receiving a template cloning request for cloning a template for a particular plane;
    wherein the particular plane is a management plane (MP) or a central control plane (CCP) in a software defined networking (SDN) environment;
    parsing the template cloning request to determine a template identifier and one or more configuration pairs included in the template cloning request;
    based on, at least in part, the template identifier, determining whether a particular template database stores a particular template that is identified by the template identifier;

in response to determining that the particular template
database stores the particular template that is identified
by the template identifier:
retrieving the particular template from the particular
template database;
generating a cloned particular template by cloning the
particular template using contents of the one or more
configuration pairs; and
storing the cloned particular template in a particular
state database that is associated with the particular
plane.

9. The one or more non-transitory computer-readable storage media of claim 8, wherein the particular plane is the MP in the SDN environment;
wherein the particular template database is an MP template database;
wherein the particular template is an MP template stored in the MP template database;
wherein the particular state database is an MP state database; and
wherein the cloned particular template is a cloned MP template.

10. The one or more non-transitory computer-readable storage media of claim 8, wherein the particular plane is the CCP in the SDN environment;
wherein the particular template database is a CCP template database;
wherein the particular template is a CCP template stored in the CCP template database;
wherein the particular state database is a CCP state database; and
wherein the cloned particular template is a cloned CCP template.

11. The one or more non-transitory computer-readable storage media of claim 8, storing additional instructions which, when executed by the one or more processors, cause the one or more processors to perform:
receiving a first request to create a first template in the particular template database;
parsing the first request to determine a first template identifier and one or more first configuration pairs included in the first request;
based on, at least in part, the first template identifier, determining whether the particular template database stores the first template that is identified by the first template identifier;
in response to determining that the particular template database stores the first template that is identified using the first template identifier, generating a modified first template by modifying the first template using contents of the one or more first configuration pairs, and storing the modified first template in the particular template database; and
in response to determining that the particular template database does not include the first template, creating the first template using contents of the one or more first configuration pairs and storing the first template in the particular template database.

12. The one or more non-transitory computer-readable storage media of claim 8, storing additional instructions which, when executed by the one or more processors, cause the one or more processors to perform:
in response to determining that the template identifier does not identify any particular template in the particular template database, requesting instructions for creating a second template and for storing the second template in the particular template database.

13. The one or more non-transitory computer-readable storage media of claim 8, wherein the particular template includes one or more objects; and wherein an object, from the one or more objects, has an associated type, an associated name, an associated identifier, and one or more associated functions.

14. The one or more non-transitory computer-readable storage media of claim 8, storing additional instructions which, when executed by the one or more processors, cause the one or more processors to perform:
receiving a second request to delete a second template from the particular template database;
parsing the second request to determine a second template identifier included in the second request;
based on, at least in part, the second template identifier, determining whether the particular template database stores the second template that is identified by the second template identifier;
in response to determining that the particular template database stores the second template that is identified by the second template identifier, deleting the second template from the particular template database; and
in response to determining that the particular template database does not include the second template, generating an error message and transmitting the error message to an entity that sent the second request.

15. A computer-based network manager configured to create and clone templates for internal states of management and control planes, the computer-based network manager comprising:
one or more processors;
one or more memory units; and
one or more non-transitory computer-readable storage media storing one or more computer instructions which, when executed by the one or more processors, cause the one or more processors to perform:
receiving input for cloning a template to capture an internal state of a particular plane;
wherein the particular plane is a management plane (MP) or a central control plane (CCP) in a software defined networking (SDN) environment;
receiving a template cloning request for cloning a template for a particular plane;
parsing the template cloning request to determine a template identifier and one or more configuration pairs included in the template cloning request;
based on, at least in part, the template identifier, determining whether a particular template database stores a particular template that is identified by the template identifier;
in response to determining that the particular template database stores the particular template that is identified by the template identifier:
retrieving the particular template from the particular template database;
generating a cloned particular template by cloning the particular template using contents of the one or more configuration pairs; and
storing the cloned particular template in a particular state database that is associated with the particular plane.

16. The computer-based network manager of claim 15, wherein the particular plane is the MP in the SDN environment;
wherein the particular template database is an MP template database;

wherein the particular template is an MP template stored in the MP template database;
wherein the particular state database is an MP state database; and
wherein the cloned particular template is a cloned MP template.

17. The computer-based network manager of claim 15, wherein the particular plane is the CCP in the SDN environment;
wherein the particular template database is a CCP template database;
wherein the particular template is a CCP template stored in the CCP template database;
wherein the particular state database is a CCP state database; and
wherein the cloned particular template is a cloned CCP template.

18. The computer-based network manager of claim 15, wherein the one or more non-transitory computer-readable storage media store additional instructions which, when executed by the one or more processors, cause the one or more processors to perform:
receiving a first request to create a first template in the particular template database;
parsing the first request to determine a first template identifier and one or more first configuration pairs included in the first request;
based on, at least in part, the first template identifier, determining whether the particular template database stores the first template that is identified by the first template identifier;
in response to determining that the particular template database stores the first template that is identified using the first template identifier, generating a modified first template by modifying the first template using contents of the one or more first configuration pairs, and storing the modified first template in the particular template database; and
in response to determining that the particular template database does not include the first template, creating the first template using contents of the one or more first configuration pairs and storing the first template in the particular template database.

19. The computer-based network manager of claim 15, wherein the one or more non-transitory computer-readable storage media store additional instructions which, when executed by the one or more processors, cause the one or more processors to perform:
in response to determining that the template identifier does not identify any particular template in the particular template database, requesting instructions for creating a second template and for storing the second template in the particular template database.

20. The computer-based network manager of claim 15, wherein the one or more non-transitory computer-readable storage media store additional instructions which, when executed by the one or more processors, cause the one or more processors to perform:
receiving a second request to delete a second template from the particular template database; parsing the second request to determine a second template identifier included in the second request;
based on, at least in part, the second template identifier, determining whether the particular template database stores the second template that is identified by the second template identifier;
in response to determining that the particular template database stores the second template that is identified by the second template identifier, deleting the second template from the particular template database; and
in response to determining that the particular template database does not include the second template, generating an error message and transmitting the error message to an entity that sent the second request.

* * * * *